(12) United States Patent
Nishikawa et al.

(10) Patent No.: US 7,359,147 B2
(45) Date of Patent: Apr. 15, 2008

(54) SINGLE POLE MAGNETIC HEAD HAVING INTERMEDIATE MAGNETIC LAYER AND TIP MAGNETIC LAYER

(75) Inventors: Kiyoshi Nishikawa, Kawasaki (JP); Maki Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 420 days.

(21) Appl. No.: 10/825,049

(22) Filed: Apr. 15, 2004

(65) Prior Publication Data
US 2005/0135007 A1    Jun. 23, 2005

(30) Foreign Application Priority Data
Dec. 18, 2003   (JP)   ............... 2003-421114

(51) Int. Cl.
    G11B 5/31   (2006.01)
    G11B 5/23   (2006.01)
    G11B 5/39   (2006.01)
(52) U.S. Cl. ...................... 360/126; 360/119
(58) Field of Classification Search ............... 360/126, 360/317, 119, 125
    See application file for complete search history.

(56) References Cited

U.S. PATENT DOCUMENTS

| | | | | |
|---|---|---|---|---|
| 6,191,916 B1* | 2/2001 | Sasaki | ......................... | 360/126 |
| 6,204,997 B1* | 3/2001 | Sasaki | ......................... | 360/126 |
| 6,483,664 B2* | 11/2002 | Kamijima | ................... | 360/126 |
| 6,490,127 B1* | 12/2002 | Sasaki | ......................... | 360/126 |
| 6,504,677 B1* | 1/2003 | Han et al. | .................... | 360/126 |
| 6,724,572 B1* | 4/2004 | Stoev et al. | ................ | 360/126 |
| 2002/0024766 A1* | 2/2002 | Sasaki et al. | ............... | 360/126 |
| 2002/0034043 A1 | 3/2002 | Okada et al. | ............... | 360/125 |
| 2002/0036864 A1* | 3/2002 | Sasaki | ......................... | 360/126 |
| 2002/0109946 A1* | 8/2002 | Sato et al. | ................... | 360/317 |
| 2003/0021063 A1* | 1/2003 | Kuroda et al. | .............. | 360/125 |
| 2004/0145826 A1* | 7/2004 | Sasaki et al. | ............... | 360/126 |
| 2004/0252415 A1* | 12/2004 | Shukh et al. | ............... | 360/317 |
| 2005/0128639 A1* | 6/2005 | Sasaki et al. | ............... | 360/126 |
| 2005/0185337 A1* | 8/2005 | Sasaki et al. | ............... | 360/126 |

FOREIGN PATENT DOCUMENTS

JP    2002-92821    3/2002

OTHER PUBLICATIONS

Liu et al.; "Advanced Probe Head for Perpendicular Recording"; IEEE Trans. on Magnetics, vol. 38, No. 4; pp. 1647-1651; Jul. 2002.
Stoev et al.; "High Linear Density Study of Advanced Single-Pole Head"; IEEE Trans. on Magnetics, vol. 38, No. 5; pp. 2243-2248; Sep. 2002.

* cited by examiner

Primary Examiner—Craig A. Renner
(74) Attorney, Agent, or Firm—Greer, Burns & Crain, Ltd

(57) ABSTRACT

A thin film magnetic head has a magnetic pole major layer terminated at a position receding from a medium-opposed surface. An intermediate magnetic layer extends forward toward the medium-opposed surface from the surface of the magnetic pole major layer. The intermediate magnetic layer is terminated at a position receding from the medium-opposed surface. A tip magnetic layer extends to the medium-opposed surface from the surface of the intermediate magnetic layer so as to expose the front end at the medium-opposed surface. The layered structure serves to diminish variation in the sectional area of the path of the magnetic flux. Saturation of magnetic flux is sufficiently suppressed irrespective of the reduction in the sectional area. Even if the tip magnetic layer is reduced in lateral width, the tip magnetic layer allows a sufficient leakage of magnetic flux from the front end.

7 Claims, 7 Drawing Sheets

SINGLE POLE MAGNETIC HEAD HAVING INTERMEDIATE MAGNETIC LAYER AND TIP MAGNETIC LAYER

BACKGROUND OF THE INVENTION

1. Field of the Invention

The present invention relates to a thin film magnetic head generally utilized to write magnetic information data in a magnetic storage device such as a hard disk drive (HDD), for example.

2. Description of the Prior Art

A so-called single pole head is generally employed in a magnetic storage device based on perpendicular recording. The single pole head comprises a magnetic pole major layer or yoke layer and a tip magnetic layer or primary magnetic pole layer. Such a single pole head is disclosed in "Advanced Probe Head for Perpendicular Recording" Liu et al., IEEE Transactions on Magnetics, Jul. 2002, vol. 38 No. 4, p 1647-1651, for example. A magnetic field is applied to the backing layer of a magnetic recording disk from the front end of the primary magnetic pole layer. Magnetic flux is introduced to the primary magnetic pole layer from the yoke layer.

A primary magnetic pole tip region is defined in the primary magnetic pole layer in a section adjacent the medium-opposed surface of a head slider. The primary magnetic pole tip region is designed to extend from the medium-opposed surface toward a coil. The primary magnetic pole tip region maintains a constant lateral width. The primary magnetic pole layer includes a section having an increased lateral width behind the rear end of the primary magnetic pole tip region. Since the thickness of the primary magnetic pole layer is set considerably smaller than that of the yoke layer, the constant lateral width of the primary magnetic pole tip region can be established at a higher accuracy. The width of recording tracks can thus be reduced on the magnetic recording disk.

However, the sectional area of the primary magnetic pole layer remarkably gets reduced at the entrance or rear end of the primary magnetic pole tip region. The reduced sectional area of the primary magnetic pole layer induces saturation of magnetic flux. As a result, the leakage of the magnetic field is made less from the front end of the primary magnetic pole tip region. If the length of the primary magnetic pole tip region can sufficiently be reduced in the primary magnetic pole layer, the primary magnetic pole layer can be prevented from suffering from degradation of the magnetic field leaking from the front end of the primary magnetic pole tip region.

Ion milling process is usually employed to form the aforementioned primary magnetic pole tip region in the primary magnetic pole layer. In this case, a photoresist film is formed on a magnetic material layer so as to define the shape of the primary magnetic pole layer. The magnetic material layer is removed around the photoresist film.

Since the lateral width of the primary magnetic pole layer gets remarkably increased behind the rear end of the primary magnetic pole tip region, the photoresist film tends to hinder the irradiation of ions at the rear end of the primary magnetic pole region. The magnetic material layer cannot sufficiently be removed near the rear end of the primary magnetic pole tip region. The primary magnetic pole tip region thus suffers from an increased lateral width at a section near the rear end. The constant lateral width cannot be established in the primary magnetic pole tip region. If the length of the primary magnetic pole tip region is reduced in the aforementioned manner, the dimensional accuracy of the primary magnetic pole tip region gets degraded at the medium-opposed surface.

SUMMARY OF THE INVENTION

It is accordingly an object of the present invention to provide a thin film magnetic head greatly contributing to a reduction in the width of a recording track on a magnetic recording medium.

According to the present invention, there is provided a thin film magnetic head comprising: a magnetic pole major layer terminated at a position receding from a medium-opposed surface; an intermediate magnetic layer extending forward toward the medium-opposed surface from the surface of the magnetic pole major layer, said intermediate magnetic layer terminated at a position receding from the medium-opposed surface; and a tip magnetic layer extending to the medium-opposed surface from the surface of the intermediate magnetic layer, the tip magnetic layer getting exposed at the medium-opposed surface.

The thin film magnetic head allows magnetic flux to circulate through the magnetic pole major layer, the intermediate magnetic layer and the tip magnetic layer in this sequence. The magnetic flux is allowed to leak out of the front end of the tip magnetic layer toward a recording medium. The layered structure of the magnetic pole major layer, the intermediate magnetic layer and the tip magnetic layer serves to diminish variation in the sectional area of the path of the magnetic flux in the thin film magnetic head. Saturation of magnetic flux is sufficiently suppressed irrespective of the reduction in the sectional area. Even if the tip magnetic layer is reduced in size or lateral width, the tip magnetic layer allows a sufficient leakage of magnetic flux from the front end thereof.

The front end of the intermediate magnetic layer may reach a position closer to the medium-opposed surface forward of the front end of the magnetic pole major layer. The sectional area is de-escalated toward the air bearing surface in the path of the magnetic flux. Moreover, adjustment on the thickness of the intermediate magnetic layer enables a precise control or design of the variation in the sectional area.

A primary magnetic pole tip region may be defined in the tip magnetic layer. The primary magnetic pole tip region may be designed to extend rearward from the medium-opposed surface, keeping a constant lateral width. The thin film magnetic head of this type enables a separate formation of the magnetic pole major layer and the tip magnetic layer. The thickness of the tip magnetic layer can be set considerably smaller than that of the magnetic pole major layer, so that the aforementioned constant lateral width can be established at the primary magnetic pole tip region at a higher dimensional accuracy. This contributes to reduction in the width of recording tracks on the recording medium. In case where the thin film magnetic head is used in a magnetic storage device such as a hard disk drive (HDD), for example, a reduced thickness of the tip magnetic layer contributes to suppression of influence from the yaw angle of a head slider relative to a recording track.

The front end of the intermediate magnetic layer may reach a position closer to the medium-opposed surface forward of the rear end of the primary magnetic pole tip region. The sectional area is de-escalated toward the air bearing surface in the path of the magnetic flux. Moreover, adjustment on the position of the front end of the intermediate magnetic layer as well as the position of the rear end of the primary magnetic pole tip region enables a precise control or design of the variation in the sectional area.

The primary magnetic pole tip region has the front end surface exposed at the medium-opposed surface. The leading edge of the front end surface may be reduced in lateral width than the trailing edge of the front end surface. In general, the leading edge of the primary magnetic pole tip region, rather than the trailing edge thereof, tends to deviate from the centerline of a recording track based on the yaw angle of the head slider relative to the recording track. The aforementioned reduction in the lateral width of the leading edge reliably enables reduction in the lateral width of the recording track. The leading edge of the primary magnetic pole tip region is reliably prevented from entering the adjacent recording tracks. Overwrite can be avoided on the adjacent recording tracks.

The thin film magnetic head may require a flat surface defined on the surface of the magnetic pole major layer. The flat surface is designed to receive the intermediate magnetic layer. The thin film magnetic head may likewise require a flat surface defined on the surface of the intermediate magnetic layer. The flat surface in this case is designed to receive the tip magnetic layer.

The intermediate magnetic layer may define an inclined surface expanding outward from the outer periphery of the tip magnetic layer. The foot of the inclined surface is received on the magnetic pole major layer. The intermediate magnetic layer of this type serves to de-escalate the sectional area of the path of the magnetic flux from the magnetic pole major layer to the tip magnetic layer.

A method may be provided to make the aforementioned thin film magnetic head. The method may comprise: forming a magnetic pole major layer adjacent a first insulating layer; forming a first magnetic material layer on the surfaces of the magnetic pole major layer and the first insulating layer, said first magnetic material layer extending forward from the front end of the magnetic pole major layer; forming a second insulating layer on the surfaces of the magnetic pole major layer and the first insulating layer so as to cover the first magnetic material layer with the second insulating layer; subjecting the second insulating layer to flattening process so as to expose at the flattened surface the first magnetic material layer surrounded by the second insulating layer; forming a second magnetic material layer on the flattened surface; forming a mask on the surface of the second magnetic material layer, said mask extending forward from the front end of the first magnetic material layer; and shaping a magnetic pole layer out of the first and second magnetic material layers by utilizing the mask.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
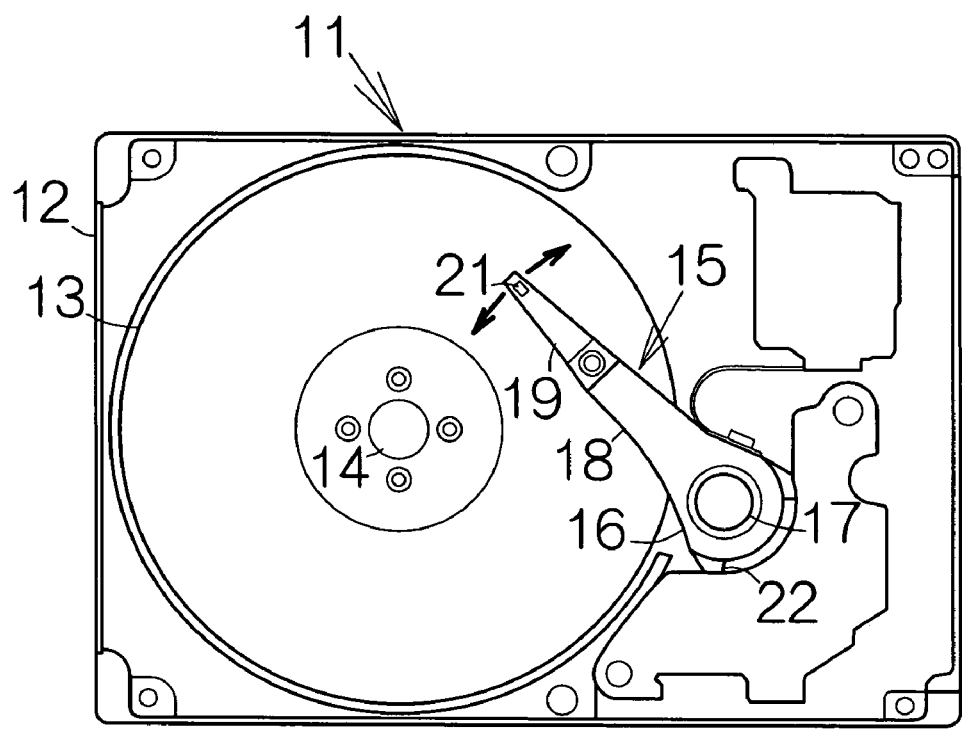
FIG. 1 is a plan view schematically illustrating the structure of a hard disk drive (HDD) as a specific example of a magnetic storage device.

FIG. 1 schematically illustrates the inner structure of a hard disk drive (HDD) 11 as an example of a magnetic recording device or storage system. The HDD 11 includes a box-shaped main enclosure 12 defining an inner space of a flat parallelepiped, for example. At least one magnetic recording disk 13 is incorporated in the inner space within the main enclosure 12. The magnetic recording disk 13 is mounted on the driving shaft of a spindle motor 14. The spindle motor 14 is allowed to drive the magnetic recording disk 13 for rotation at a higher revolution speed such as 7,200 rpm or 10,000 rpm, for example. A cover, not shown, is coupled to the main enclosure 12 so as to define the closed inner space between the main enclosure 12 and itself.

A head actuator 15 is also incorporated within the inner space of the main enclosure 12. The head actuator 15 includes an actuator block 16 supported on a vertical support shaft 17 for rotation. Rigid actuator arms 18 are defined in the actuator block 16. The actuator arms 18 are designed to extend in a horizontal direction from the vertical support shaft 17. The actuator arms 18 are associated with the front and back surfaces of the magnetic recording disk or disks 13, respectively. The actuator block 16 may be made of aluminum. Molding process may be employed to form the actuator block 16.

Elastic head suspensions 19 are fixed to the tip ends of the actuator arms 18. The individual head suspension 19 is designed to extend forward from the corresponding tip end of the actuator arm 18. As conventionally known, a flying head slider 21 is supported on the front end of the individual head suspension 19. The flying head sliders 21 are opposed to the surfaces of the magnetic recording disk or disks 13.

The head suspension 19 serves to urge the flying head slider 21 toward the surface of the magnetic recording disk 13. When the magnetic recording disk 13 rotates, the flying head slider 21 is allowed to receive airflow generated along the rotating magnetic recording disk 13. The airflow serves to generate a lift and/or a negative pressure on the flying head slider 21. The flying head slider 21 is thus allowed to keep flying above the surface of the magnetic recording disk 13 during the rotation of the magnetic recording disk 13 at a higher stability established by the balance between the lift as well as the negative pressure and the urging force of the head suspension 19.

A power source 22 such as a voice coil motor (VCM) is connected to the tail of the actuator block 16. The power source 22 drives the actuator block 16 for rotation around the support shaft 17. The rotation of the actuator block 16 induces the swinging movement of the actuator arms 18 and the head suspensions 19. When the actuator arm 18 is driven to swing about the support shaft 17 during the flight of the flying head slider 21, the flying head slider 21 is allowed to cross the recording tracks defined on the magnetic recording disk 13 in the radial direction of the magnetic recording disk 13. This radial movement serves to position the flying head slider 21 right above a target recording track on the magnetic recording disk 13.

Figure 2:
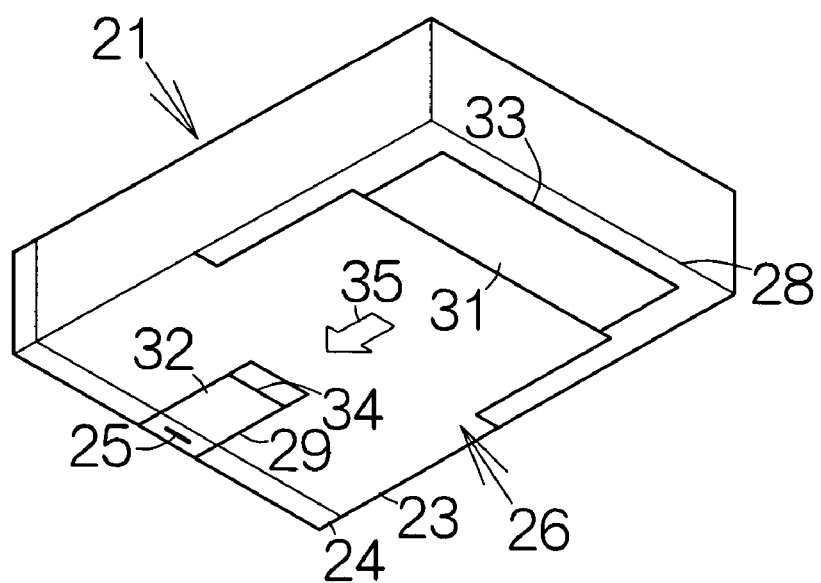
FIG. 2 is an enlarged perspective view schematically illustrating the structure of a flying head slider according to a specific example.

FIG. 2 illustrates a specific example of the flying head slider 21. The flying head slider 21 includes a slider body 23 made of $Al_2O_3$—TiC in the form of a flat parallelepiped. A head protection layer 24 made of $Al_2O_3$ (alumina) is coupled to the outflow or trailing end of the slider body 23. The read/write electromagnetic transducer 25 is contained within the head protection layer 24. A medium-opposed surface or bottom surface 26 is defined over the slider body 23 and the head protection layer 24 so as to face the magnetic recording disk 13 at a distance.

A front rail 28 and a rear rail 29 are formed on the bottom surface 26. The front rail 28 is designed to extend along the inflow or leading end of the slider body 23. The rear rail 29 is located near the outflow or trailing end of the slider body 23. Air bearing surfaces (ABSs) 31, 32 are respectively defined on the top surfaces of the front and rear rails 28, 29. The inflow ends of the air bearing surfaces 31, 32 are connected to the top surfaces of the front and rear rails 28, 29 through steps 33, 34, respectively. The read/write electromagnetic transducer 25 exposes the tip or front end at the air bearing surface 32. It should be noted that the front end of the read/write electromagnetic transducer 25 may be covered with a protection layer, made of diamond-like-carbon (DLC), extending over the air bearing surface 32.

The bottom surface 26 of the flying head slider 21 is designed to receive airflow 35 generated along the rotating magnetic recording disk 13. The steps 33, 34 serve to generate a relatively larger positive pressure or lift at the air bearing surfaces 31, 32. Moreover, a larger negative pressure is induced behind the front rail 28. The negative pressure is balanced with the lift so as to stably establish a flying attitude of the flying head slider 21. The flying head slider 21 may take any shape or form other than the aforementioned one.

Figure 3:
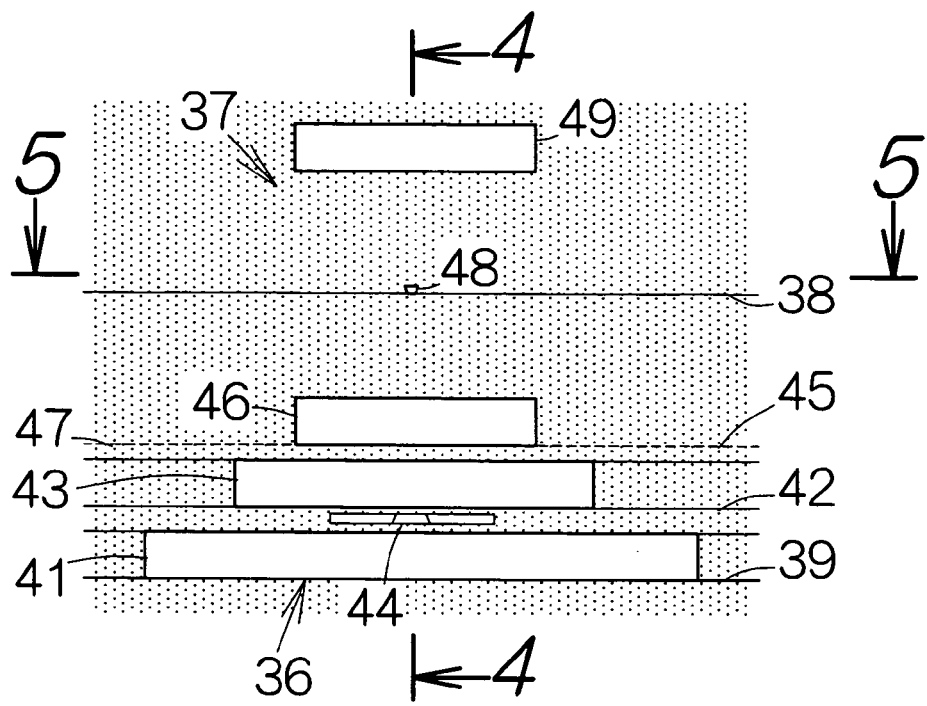
FIG. 3 is a front view schematically illustrating a read/write electromagnetic transducer observed at an air bearing surface of the flying head slider.

FIG. 3 illustrates the structure of the bottom surface 26. The read/write electromagnetic transducer 25 includes a read head element 36 and a thin film magnetic head, namely a single pole head 37. The read head element 36 is designed to detect bit data by utilizing variation of the electric resistance in response to the inversion of the magnetic polarity in a magnetic field acting from the magnetic recording disk 13, as conventionally known. The single pole head 37 is designed to write bit data into the magnetic recording disk 13 by utilizing the magnetic field induced in a conductive swirly coil pattern as described later in detail. The read head element 36 and the single pole head 37 are located between $Al_2O_3$ (alumina) layers 38, 39. The alumina layer 38 corresponds to the upper half layer of the head protection layer 24, namely the overcoat film, while the alumina layer 39 corresponds to the lower half layer of the head protection layer 24, namely the undercoat film.

The read head element 36 includes a lower shield layer 41 extending on the upper surface of the alumina layer 39. An insulating layer 42 covers over the upper surface of the lower shield layer 41. An upper shield layer 43 extends on the upper surface of the insulating layer 42. The lower and upper shield layers 41, 43 may be made from a magnetic material such as FeN, NiFe, or the like, for example. The lower and upper shield layers 41, 43 may have a thickness ranging from 1 µm to 2 µm approximately, for example.

A magnetoresistive element 44 is located within the insulating layer 42 between the lower and upper shield layers 41, 43. A giant magnetoresistive (GMR) element or a tunnel-junction magnetoresistive (TMR) element may be employed as the magnetoresistive element 44, for example. The GMR element is designed to detect binary data from the magnetic recording disk 13 by utilizing variation in the resistance of a so-called spin valve film. The TMR element is designed to detect binary data from the magnetic recording disk 13 by utilizing variation in the resistance of a so-called tunnel-junction film. A predetermined space is set between the lower and upper shield layers 41, 43 so as to determine linear resolution of magnetic recordation along recording tracks on the magnetic recording disk 13.

The single pole head 37 includes a lower magnetic pole layer or subsidiary magnetic pole 46 extending along a datum plane 45 above the upper shield layer 43. The datum plane 45 is defined by the upper surface of a non-magnetic layer 47 such as an $Al_2O_3$ layer overlaid on the upper surface of the upper shield layer 43 by a constant thickness, for example. The non-magnetic layer 47 serves to magnetically isolate the upper shield layer 43 and the subsidiary magnetic pole 46 from each other.

A primary magnetic pole 48 is located within the alumina layer 38 above the subsidiary magnetic pole 46, as described later in detail. A shield layer 49 is located above the primary magnetic pole 48 within the alumina layer 38. The shield layer 49 may be made of a magnetic material including Ni and/or Fe, for example. Here, the shield layer 49 is made of NiFe. The thickness of the shield layer 49 may be set in a range between 1 µm and 2 µm approximately.

Figure 4:
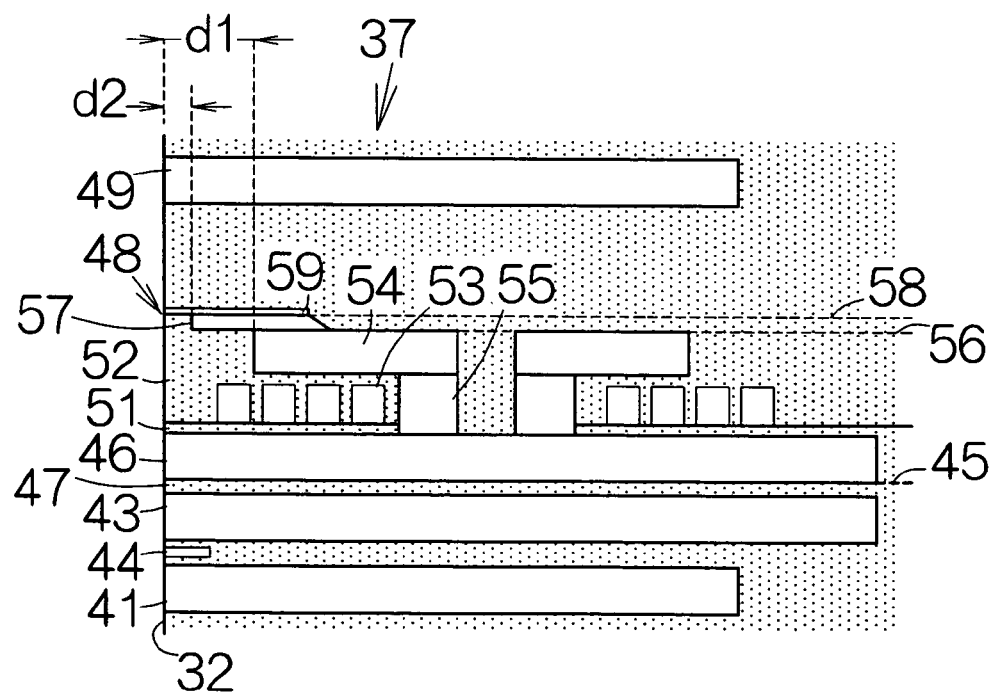
FIG. 4 is an enlarged cross-sectional view taken along the line 4-4 in FIG. 3.

As shown in FIG. 4, an insulating layer 51 is overlaid on the upper surface of the subsidiary magnetic pole 46. An insulating layer 52 is overlaid on the upper surface of the insulating layer 51 so as to contain a conductive swirly coil pattern 53. The insulating layers 51, 52 serve to establish a so-called gap layer. The overall thickness of the insulating layers 51, 52, namely the thickness of the gap layer may be set at 3 mµ-6 µm approximately, for example.

A magnetic pole major layer 54 is overlaid on the upper surface of the insulating layer 52. The magnetic pole major layer 54 is terminated at a first position receding from the air bearing surface 32. The first position is determined by a distance d1 from the air bearing surface 32. The magnetic pole major layer 54 may be made of a magnetic material including Ni and/or Fe, for example. Here, the magnetic pole major layer 54 is made of NiFe, for example. The thickness of the magnetic pole major layer 54 may be set at 1 µm-3 µm approximately, for example.

The rear end of the magnetic pole major layer 54 is received on a connection magnetic piece 55 at the center of the conductive swirly coil pattern 53. The connection magnetic piece 55 is formed on the upper surface of the subsidiary magnetic pole 46. The connection magnetic piece 55 may be made of a magnetic material including Ni and/or Fe, for example. Here, the connection magnetic piece 55 is made of NiFe, for example. The connection magnetic piece 55 serves to magnetically connect the magnetic pole major layer 54 and the subsidiary magnetic pole 46.

A flattened surface 56 is defined on the upper surface of the magnetic pole major layer 52. An intermediate magnetic layer 57 is received on the flattened surface 56. The intermediate magnetic layer 57 is designed to extend toward the air bearing surface 32 from the upper surface of the magnetic pole major layer 54. The intermediate magnetic layer 57 is terminated at a second position receding from the air bearing surface 32. The second position is determined by a distance d2, smaller than the distance d1, from the air bearing surface 32. The front end of the intermediate magnetic layer 57 is thus positioned closer to the air bearing surface 32 than the front end of the magnetic pole major layer 54. The distance d2 may be set in a range from tens nanometers to 100 nm, approximately. The intermediate magnetic layer 57 may be made of a magnetic material including Ni and/or Fe, for example. Here, the intermediate magnetic layer 57 is made of NiFe, for example. The thickness of the intermediate magnetic layer 57 may be set in a range between 200 nm and 500 nm approximately, for example.

A flattened surface 58 is also defined on the upper surface of the intermediate magnetic layer 57. A tip magnetic layer 59 is received on the flattened surface 58. The tip magnetic layer 59 is designed to extend toward the air bearing surface 32 from the upper surface of the intermediate magnetic layer 57. The front end of the tip magnetic layer 59 gets exposed at the air bearing surface 32. The tip magnetic layer 59 may be made of a magnetic material such as FeCo, FeNiCo, or the like, for example, having a higher saturation magnetic density. The magnetic pole major layer 54, the intermediate magnetic layer 57 and the tip magnetic layer 59 constitute the aforementioned primary magnetic pole 48. The primary magnetic pole 48 in combination with the subsidiary magnetic pole 46 serves to establish the magnetic core of the single pole head 37.

When a magnetic field is induced at the coil pattern 53, the magnetic flux is allowed to circulate through the primary and subsidiary magnetic poles 48, 46. Specifically, the magnetic flux flows sequentially through the magnetic pole major layer 54, the intermediate magnetic layer 57 and the tip magnetic layer 59. The magnetic flux is allowed to leak out of the air bearing surface 32 from the front end of the tip magnetic layer 59 toward the magnetic recording disk 13. The leaked magnetic flux forms the magnetic field for recordation.

Figure 5:
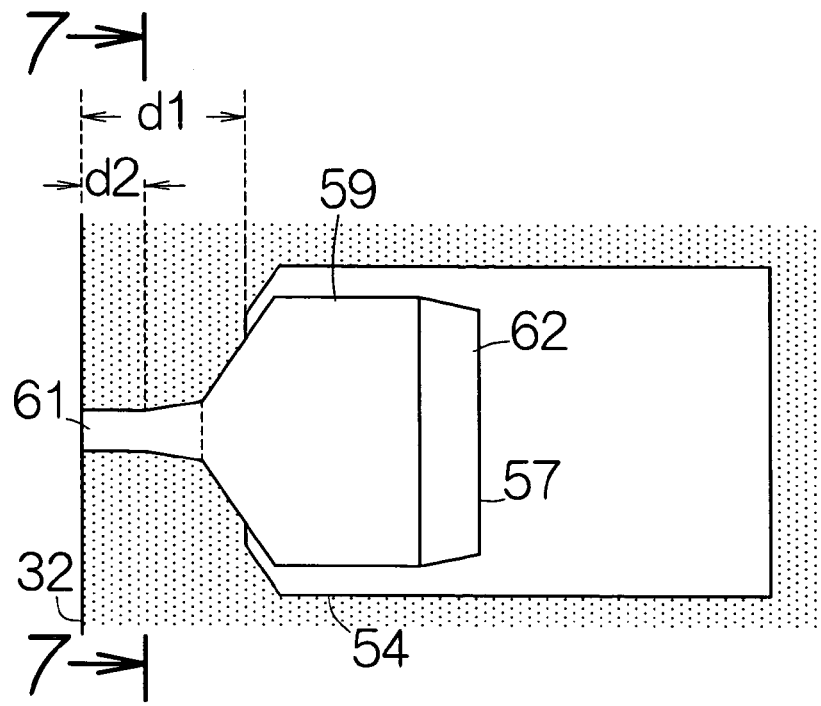
FIG. 5 is an enlarged cross-sectional view taken along the line 5-5 in FIG. 3.

As shown in FIG. 5, a primary magnetic pole tip region 61 is defined in the tip magnetic layer 59. The primary magnetic pole tip region 61 is designed to extend rearward from the air bearing surface 32. The lateral width of the primary magnetic pole tip region 61 is set constant. The primary magnetic pole layer 59 includes a section having an increased lateral width behind the rear end of the primary magnetic pole tip region 61. The increase of the lateral width is remarkable. Still, the primary magnetic pole tip region 61 may include a section having an increased lateral width behind the aforementioned second position or the front end of the intermediate magnetic layer 57. The increase of the lateral width in this case is slight and gradual. The lateral width of the primary magnetic pole tip region 61 serves to determine resolution of magnetic recordation in the lateral direction of the recording tracks on the magnetic recording disk 13. The single pole head 37 enables a separate formation of the magnetic pole major layer 54 and the tip magnetic layer 59. The thickness of the tip magnetic layer 59 can be set considerably smaller than that of the magnetic pole major layer 54, so that the aforementioned constant lateral width can be established at the primary magnetic pole tip region 61 at a higher dimensional accuracy. This contributes to reduction in the width of recording tracks on the magnetic recording disk 13.

As described above, the front end of the intermediate magnetic layer 57 is terminated at the second position. Specifically, the front end of the intermediate magnetic layer 57 gets closer to the air bearing surface 32 as compared with the rear end of the primary magnetic pole tip region 61. The sectional area is de-escalated toward the air bearing surface 32 in the path of the magnetic flux. Moreover, adjustment on the position of the front end of the intermediate magnetic layer 57 and the primary magnetic pole tip region 61 enables a precise control or design of the variation in the sectional area.

An inclined surface 62 is defined on the intermediate magnetic layer 57. The inclined surface 62 is designed to expand outward from the outer periphery of the tip magnetic layer 59. The foot of the inclined surface 62 is received on the upper surface of the magnetic pole major layer 54. The inclined surface 62 thus serves to gradually reduce the path of magnetic flux within the intermediate magnetic layer 57 toward the tip magnetic layer 59. The contour of the intermediate magnetic layer 57 is aligned with the contour of the tip magnetic layer 59 except the tip end of the intermediate magnetic layer 57 and the inclined surface 62.

Figure 6:
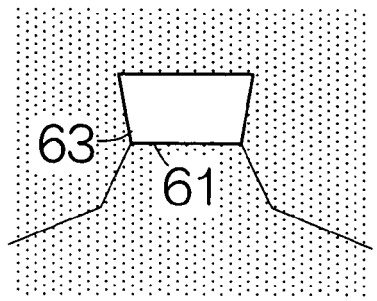
FIG. 6 is a front view schematically illustrating a front end surface of a primary magnetic pole tip region at the air bearing surface.
Figure 7:
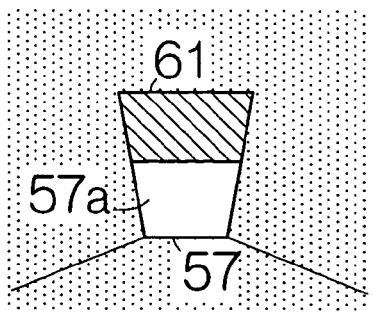
FIG. 7 is an enlarged cross-sectional view taken along the line 7-7 in FIG. 5, for schematically illustrating a front end surface of an intermediate magnetic layer at a position receding from the air bearing surface.

As shown in FIG. 6, the primary magnetic pole tip region 61 exposes a front end surface 63 at the air bearing surface 32. The leading edge of the front end surface 63 is reduced in the lateral width than the trailing edge of the front end surface 63. Here, the front end surface 63 is described in a trapezoid. In general, the leading edge of the primary magnetic pole tip region 61, rather than the trailing edge thereof, tends to deviate from the centerline of a recording track based on the yaw angle of the flying head slider 21 relative to the recording track. The aforementioned reduction in the lateral width of the leading edge reliably enables reduction in the lateral width of the recording track. The leading edge of the primary magnetic pole tip region 61 is reliably prevented from entering the adjacent recording tracks. Overwrite can be avoided on the adjacent recording tracks. Here, the thickness of the tip magnetic layer 59 may be set in a range between 100 nm and 300 nm approximately as described above. The core width of the primary magnetic pole tip region 61 may be set in a range between 60 nm and 150 nm approximately in the tip magnetic layer 59. As shown in FIG. 7, the intermediate magnetic layer 57 also exposes a front end surface 57a at the air bearing surface 32. The leading edge of the front end surface 57a may be set smaller than the trailing edge in the lateral width in the similar manner.

The layered structure of the magnetic pole major layer 54, the intermediate magnetic layer 57 and the tip magnetic layer 59 serves to diminish variation in the sectional area of the path of the magnetic flux in the single pole head 37. Saturation of magnetic flux is sufficiently suppressed irrespective of the reduction in the sectional area. Even if the primary magnetic pole tip region 61 is reduced in size, the primary magnetic pole tip region 61 allows a sufficient leakage of magnetic flux from the front end thereof.

Two or more of the intermediate magnetic layers 57 may be layered on the upper surface of the magnetic pole major layer 54 in the single pole head 37. In this case, an upper one of the adjacent intermediate magnetic layers 57 is terminated at a position closer to the air bearing surface 32 than the front end of a lower one of the adjacent intermediate magnetic layers 57. The layered structure of the intermediate magnetic layers 57 in this manner promotes diminishment of variation in the sectional area of the path of the magnetic flux in the single pole head 37.

Next, a brief description will be made on a method of making the aforementioned read/write electromagnetic transducer 25. A wafer made of $Al_2O_3$—TiC is first prepared, for example. The alumina layer 39, the lower shield layer 41, the magnetoresistive element 44, the insulating layer 42, the upper shield layer 43 and the non-magnetic layer 47 are formed on the upper surface of the wafer in a conventional manner. The read head element 36 has thus been established.

Figure 8:
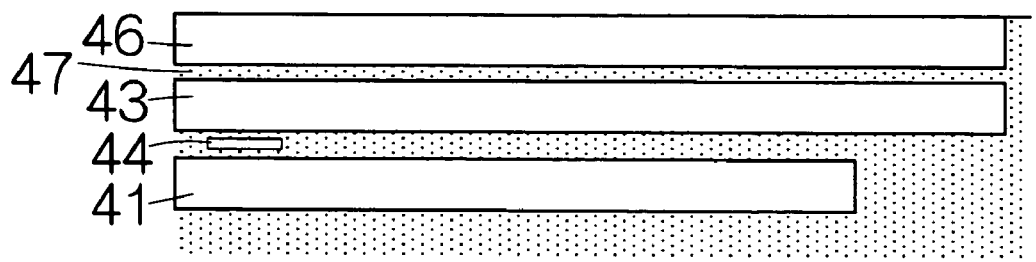
FIG. 8 is an enlarged partial vertical cross-sectional view of a wafer for schematically illustrating a process of forming a subsidiary magnetic pole.

As shown in FIG. 8, the subsidiary magnetic pole 46 is then formed on the upper surface of the non-magnetic layer 47. An insulating film, not shown, such as an alumina film, is subsequently formed on the upper surface of the subsidiary magnetic pole 46. The subsidiary magnetic pole 46 is covered with the insulating film. The insulating film is subjected to flattening process such as chemical mechanical polishing (CMP), for example. The subsidiary magnetic pole 46 thus gets exposed at the flattened surface. The subsidiary magnetic pole 46 is surrounded by the insulating film at the flattened surface.

Figure 9:
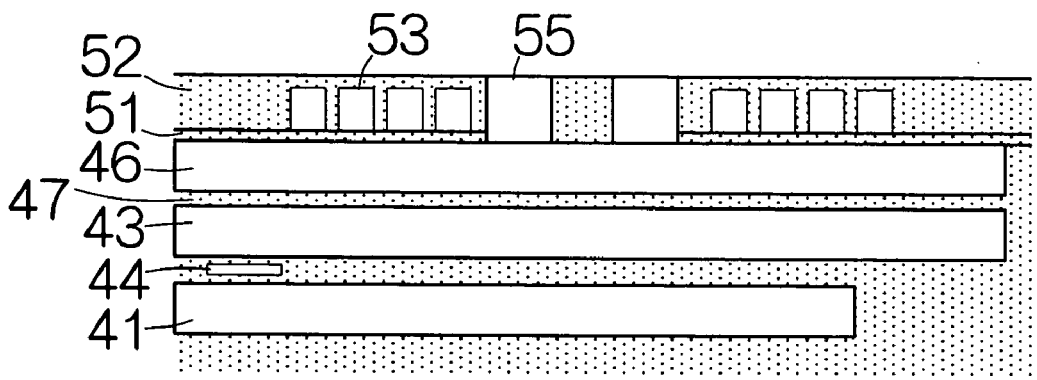
FIG. 9 is an enlarged partial vertical cross-sectional view of the wafer for schematically illustrating a process of forming a connection magnetic piece and a conductive swirly coil pattern.

As shown in FIG. 9, the connection magnetic piece 55 is thereafter formed on the upper surface of the subsidiary magnetic pole 46. The thickness or height of the connection magnetic piece 55 is set in a range between 2 µm and 4 µm approximately, for example. The insulating layer 51 is then formed on the upper surface of the subsidiary magnetic pole 46. The conductive swirly coil pattern 53 is subsequently formed on the upper surface of the insulating layer 51. The thickness of the conductive swirly coil pattern 53 may be set in a range between 1 µm and 3 µm approximately, for example.

A photoresist material is then filled within a space surrounding the conductive swirly coil pattern 53 on the insulting layer 51. The conductive swirly coil pattern 53 and the photoresist material are subsequently covered with an insulating material. The insulating material may be $Al_2O_3$, $SiO_2$, or the like, for example. The conductive swirly coil pattern 53 and the connection magnetic piece 55 are covered with a first insulating layer, namely the insulating layer 52. The insulating layer 52 is then subjected to flattening process such as chemical mechanical polishing. The connection magnetic piece 55 thus gets exposed at the flattened surface. The connection magnetic piece 55 is surrounded by the insulating layer 52 at the flattened surface.

Figure 10:
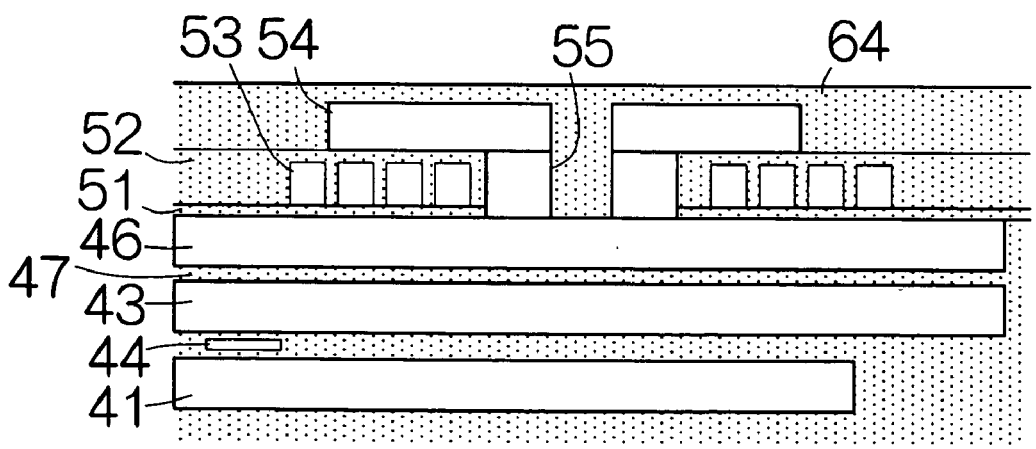
FIG. 10 is an enlarged partial vertical cross-sectional view of the wafer for schematically illustrating a process of forming a magnetic pole major layer.
Figure 11:
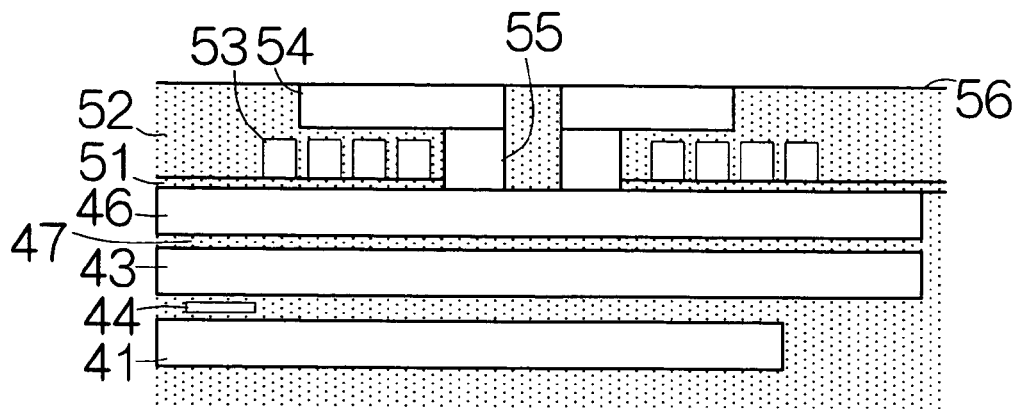
FIG. 11 is an enlarged partial vertical cross-sectional view of the wafer for schematically illustrating a process of forming the magnetic pole major layer.

As shown in FIG. 10, the magnetic pole major layer 54 is formed on the upper surfaces of the insulating layer 52 and the connection magnetic piece, namely on the upper surface of a substratum. Plating process may be employed to form the magnetic pole major layer 54 of a predetermined shape, for example. An insulating film 64 such as an alumina layer is then formed on the upper surface of the insulating layer 52. The magnetic pole major layer 54 is thus covered with the insulating film 64. The insulating film 64 is thereafter subjected to flattening process such as chemical mechanical polishing. As shown in FIG. 11, the magnetic pole major layer 54 gets exposed at the flattened surface 56. The magnetic pole major layer 54 is surrounded by the insulating film 64 or the insulating layer 52. The magnetic pole major layer 54 is located adjacent the insulating layer 52.

Figure 12:
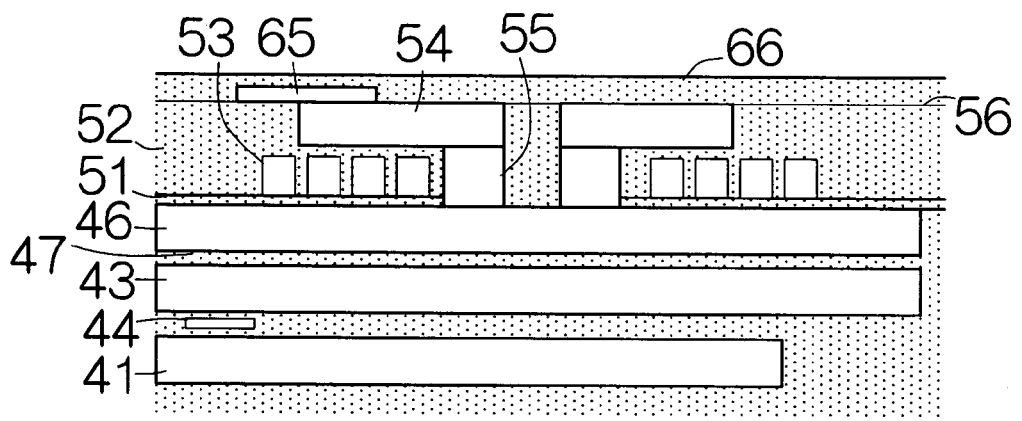
FIG. 12 is an enlarged partial vertical cross-sectional view of the wafer for schematically illustrating a process of forming a first magnetic material layer.
Figure 13:
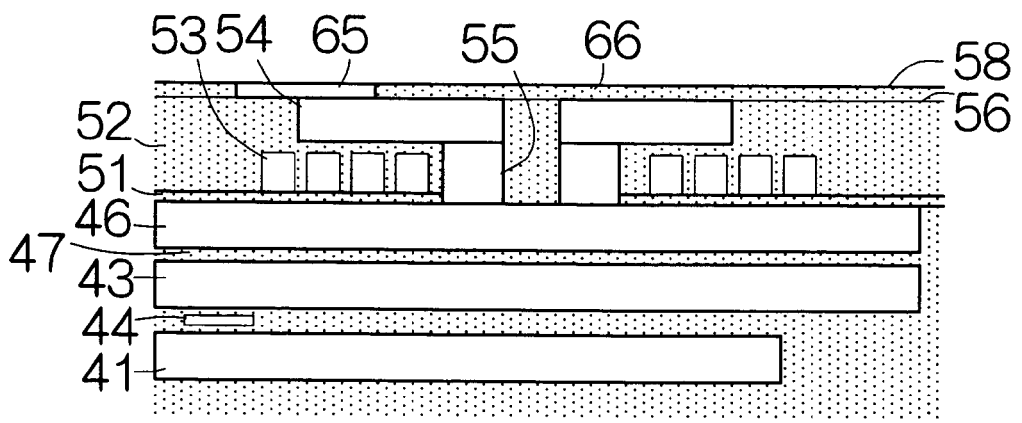
FIG. 13 is an enlarged partial vertical cross-sectional view of the wafer for schematically illustrating a process of forming the first magnetic material layer.

As shown in FIG. 12, a first magnetic material layer 65 is thereafter formed to extend on the flattened surface 56. The first magnetic material layer 65 is designed to extend forward from the front end of the magnetic pole major layer 54. Plating process may be employed to form the first magnetic material layer 65 of a predetermined shape, for example. An insulating film 66 such as an alumina film is formed to extend on the flattened surface 56. The first magnetic material layer 65 is covered with the insulating film 66. The insulating film 66 is subsequently subjected to flattening process such as chemical mechanical polishing. As shown in FIG. 13, the first magnetic material layer 65 thus gets exposed at the flattened surface 58. The first magnetic material layer 65 is surrounded by the insulating film 66.

Figure 14:
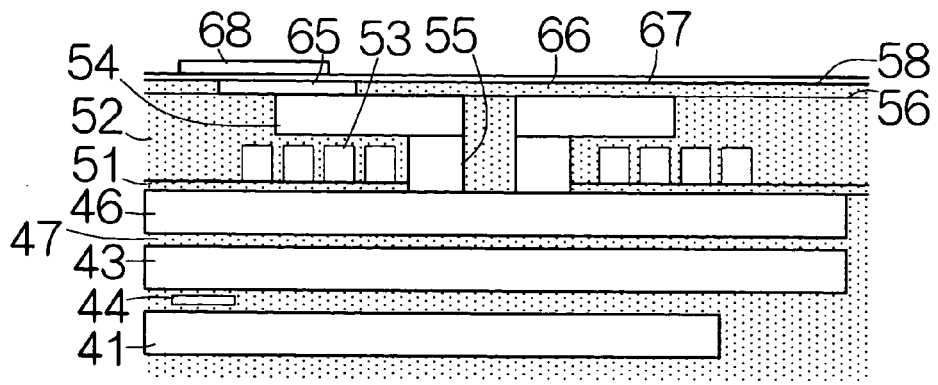
FIG. 14 is an enlarged partial vertical cross-sectional view of the wafer for schematically illustrating a process of forming a second magnetic material layer and a photoresist film.
Figure 15:
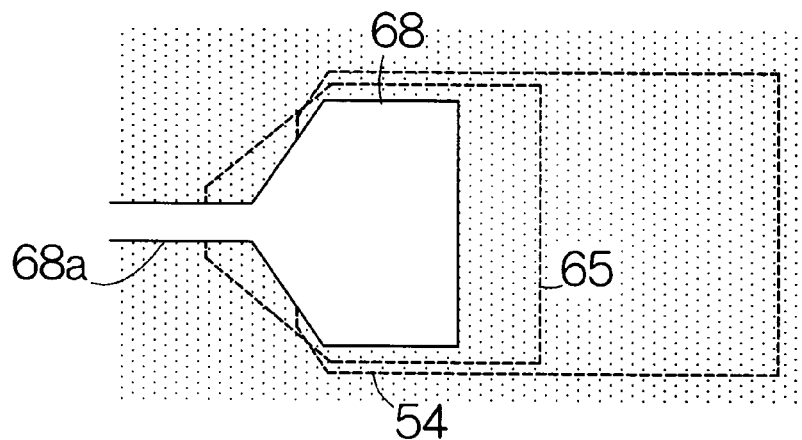
FIG. 15 is an enlarged partial plan view of the wafer for schematically illustrating a process of forming the photoresist film.

As shown in FIG. 14, a second magnetic material layer 67 is then formed all over the flattened surface 58. Sputtering process may be employed to form the second magnetic material layer 67, for example. A mask or photoresist film 68 is subsequently formed on the upper surface of the second material layer 67. The second material layer 67 is designed to extend forward from the front end of the first magnetic material layer 65. As shown in FIG. 15, the contour of the photoresist film 68 is located inside the contour of the first magnetic material layer 65 except the front end of the photoresist film 68. The contour of the first magnetic material layer 65 is likewise described inside the contour of the magnetic pole major layer 54 except the front end of the first magnetic material layer 65. A hard mask such as an $Al_2O_3$ film, a $SiO_2$ film, a Ti film, a Ta film, or the like may be employed as the mask in place of the photoresist film 68.

The first and second magnetic material layers 65, 67 are then shaped into the intermediate and tip magnetic layers 57, 59 by utilizing the photoresist film 68. Dry etching may be employed to shape the intermediate and tip magnetic layers 57, 59, for example. Irradiation of ions is inclined by a predetermined inclination angle at a tip section 68a corresponding to the contour of the primary magnetic pole tip region 61. This inclination enables establishment of a trapezoid shape at the sectional area of the first and second magnetic material layers 65, 67. As a result, the leading edge of the primary magnetic pole tip region 61 is set smaller than the trailing edge of the primary magnetic pole tip region 61 in the tip magnetic layer 59 as described above.

Figure 16:
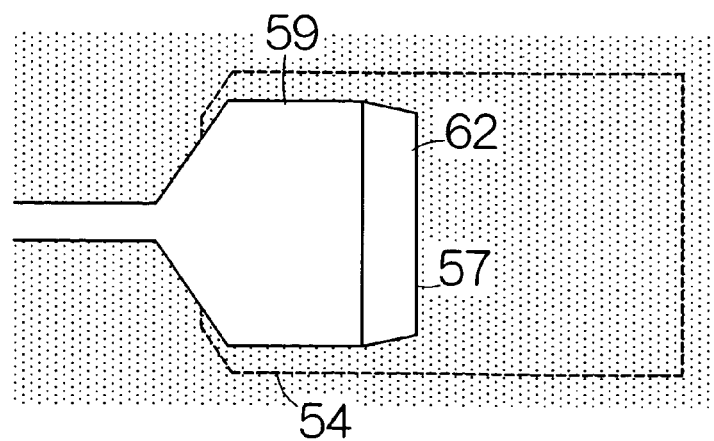
FIG. 16 is an enlarged partial plan view of the wafer for schematically illustrating a process of forming intermediate and tip magnetic layers out of the first and second magnetic material layers.
Figure 17:
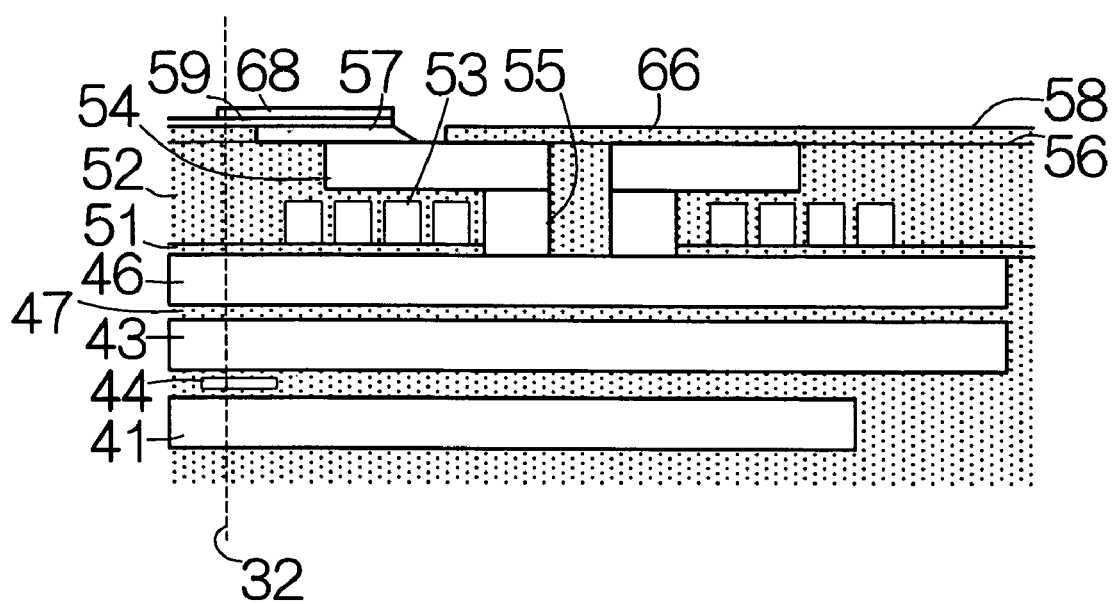
FIG. 17 is an enlarged partial vertical cross-sectional view of the wafer for schematically illustrating a process of forming an air bearing surface based on polishing process.

Ions are likewise irradiated at the rear end of the photoresist film 68. As a result, the inclined surface 62 can be formed on the first magnetic material layer 65. As shown in FIG. 16, the intermediate and tip magnetic layers 57, 59 can be obtained in this manner. The contour of the intermediate magnetic layer 57 is aligned with the contour of the tip magnetic layer 59 except the front end of the intermediate layer 57 and the inclined surface 62 as described above. Here, the core width of the primary magnetic pole tip region 61 may be set in a range between 60 nm and 150 nm approximately in the tip magnetic layer 59, for example. The alumina layer 38 as well as the shield layer 49 are thereafter formed on the tip magnetic layer 59. As shown in FIG. 17, polishing process is applied to establish the air bearing surface 32.

It should be noted that sputtering process may be employed to form the aforementioned magnetic pole major layer 54. In this case, the magnetic pole major layer 54 may be shaped out of the sputtered material based on photolithography, dry etching, or the like.

What is claimed is:

1. A single pole magnetic head comprising:
    an auxiliary pole;
    a main pole terminated at a position receding from a medium-opposed surface, the main pole having a lower surface opposed to the auxiliary pole at a distance;
    a connection piece connecting the rear of the main pole to the auxiliary pole at a center of a coil pattern;
    an intermediate magnetic layer extending forward toward the medium-opposed surface from an upper surface of the main pole and terminating at a position receding from the medium-opposed surface; and
    a tip magnetic layer extending to the medium-opposed surface from an upper surface of the intermediate magnetic layer, and being exposed at the medium-opposed surface;
    wherein a front end of the intermediate magnetic layer is positioned closer to the medium-opposed surface than a front end of the main pole.

2. The single pole magnetic head according to claim 1, wherein said intermediate magnetic layer defines an inclined surface expanding outward from an outer periphery of the tip magnetic layer, a foot of the inclined surface being received on the main pole.

3. The single pole magnetic head according to claim 1, wherein a primary magnetic pole tip region is defined in the tip magnetic layer, the primary magnetic pole tip region extending rearward from the medium-opposed surface, keeping a constant lateral width.

4. The single pole magnetic head according to claim 3, wherein a front end of the intermediate magnetic layer is positioned closer to the medium-opposed surface than a rear end of the primary magnetic pole tip region.

5. The single pole magnetic head according to claim 3, wherein the primary magnetic pole tip region has a front end surface exposed at the medium-opposed surface, a leading edge of the front end surface being reduced in lateral width than a trailing edge of the front end surface.

6. The single pole magnetic head according to claim 1, wherein a flat surface is defined on a surface of the main pole so as to receive the intermediate magnetic layer.

7. The single pole magnetic head according to claim 1, wherein a flat surface is defined on a surface of the intermediate magnetic layer so as to receive the tip magnetic layer.

* * * * *